United States Patent Office 2,946,688
Patented July 26, 1960

2,946,688

METHOD OF STABILIZING THE FLAVOR OF FOODS AND THE RESULTING PRODUCT

Waldemar A. Rosenthal and Hamilton A. Pinkalla, Milwaukee, Wis., assignors to Chr. Hansen's Laboratory, Inc., Milwaukee, Wis., a corporation of New York No Drawing. Filed July 28, 1958, Ser. No. 751,190

8 Claims. (Cl. 99—97)

This invention relates to improvements in compositions for stabilizing flavors in foods by the use of yeast of the species known as *Torulopsis utilis* or torula yeast, and the derivatives thereof.

Foods, such as cheese spreads, baby foods, soups and the like frequently have bland or subtle flavors due to the blending of a number of bland flavors and the flavors are easily lost. In some cases, such as in cheese spreads, the food may be prepared from small pieces so that much of the mass of such pieces is exposed to oxygen, heat and light which have particularly detrimental effects on the flavor. Other flavors are inherently so bland that even brief storage under ordinary conditions is sufficient to cause deterioration or complete loss of the flavor in some cases, unless a material is added which will fix or stabilize the flavor.

Such additives must of course be edible and should have either no flavor or only a mild and pleasant flavor in themselves. Further, such additives should not co-act or react with the flavor producing compounds in the foods in such way as to cause deterioration or loss of flavor of the food itself or to substantially alter the flavor of the original food. The additives may not alter the appearance, texture and other characteristics of the food in an undesirable manner. Further, additives are preferred which have food value in themselves and in which all the constituents are fully digestible by normal human metabolic processes. A food additive should also be compatible with any food whether the food content includes fatty or aqueous components.

Yeast of the species known as *Sacchromyces cerevisiae* has long been used by bakers and brewers and in its dried and inactive form is used as a food additive and dietary supplement. Dried brewers yeast is debittered (freed from the resins of hops and of the grain used) and sold in considerable quantity as a by-product of the brewing industry. However, such yeast has a high and distinctive flavor which is distinctly unpleasant to some persons and can be used as an additive to food only if the flavor of the food itself is sufficiently high to conceal the yeasty flavor or if the food flavor and the yeast flavor make a palatable blend. Due to the cost of manufacture of the strains of *S. cerevisiae* used for baker's and brewer's yeast, such yeast is not available as a primary product for use as a low cost additive for stablizing or intensifying food flavors.

A species of yeast known as *Torulopsis utilis* or torula yeast, is now commercially available and is made from low cost material such as by-product sugar cane, molasses or the waste sulfite liquor from wood pulping. Such yeast has a pleasant flavor and need not be debittered to make it palatable. Being a primary product rather than a by-product of a fermentation industry, the yeast can be grown under such conditions as will maintain a flavor of optimum quality rather than having a flavor determined by its initial use in making another product. The production of torula yeast is less subject to contamination by "wild yeasts" than the production of *S. cere-* *visiae* yeasts and the torula yeast is accordingly more readily kept to a uniform flavor than the *S. cerevisiae* yeasts.

We have found that torula yeast alone, in combination with its autolysate or in the form of its autolysate alone, can be added to foods with bland or subtle flavors without affecting such flavors other than to intensify and preserve them. When torula yeast is to be used alone, it is dried at a temperature to inactivate the yeast and thereby avoid fermentation and minimize other enzyme action in the food to which it is added. Such drying is done to leave less than 5% residual water.

We make an unique autolysate of the yeast by mixing dried torula yeast with a 16% sodium chloride solution and in the ratio of 2.3 parts by weight of the solution to 1.0 part by weight of the dried yeast. The above proportions provide a ratio of .9–1.2 part protein to 1.0 part sodium chloride, which is critical in providing a non-settling product of maximum protein content and of a viscosity which is readily poured and pumped with the usual equipment. If a higher ratio of protein to salt is used, the product becomes so liquid that the solids settle relatively quickly, and if a lower ratio of protein to salt is used, the yeast does not autolyse sufficiently to make a "pumpable" product.

The mixture is held at 37–40° C. with stirring for 24 hours. It is our purpose to obtain substantially complete autolysis (rupture of the cell walls) but to retain the enzymes and other proteins and the carbohydrates of the yeast in substantially their original form and without any significant degradation. We are aware of the published processes for autolysing of *S. cerevisiae* yeast, which state that the optimum autolytic temperature is 48–49° C. and state that temperatures as high as 65° C. may be used. However, such higher temperatures cause changes in yeast proteins which we have found undesirable for our product.

Our processing yields an autolysate which is a colloidal solution having a ratio of protein to sodium chloride of .9–1.2 to 1.0 and is at a pH 6.0–6.5. The final product is non-filterable and does not settle during more than 36 weeks of storage time. The color is a very light tan approximating that of the usual correspondence filing folder and is much lighter in color than the usual autolysates made from *S. cerevisiae* yeast which have not been de-colorized. In consistency the product is a light paste which can be readily poured and pumped. The product is almost tasteless, the major taste sensation apparent to even experienced tasters being that of sodium chloride. The autolysate has a pH of 6.0–6.5 which pH does not appear to affect the flavor of foods to which it is added. All constituents of the final product are believed to be fully digestible by normal human metabolic processes.

In use, e.g. the autolysate has been mixed with cheese to make process cheese spreads. Such spreads are made by melting the cheese, adding flavorings and the autolysate while the cheese is melted and continuing stirring with the cheese in melted condition until homogeneous whereupon the mixture is run into molds and cooled. We have had a number of different process cheese compositions prepared by cheese product processors and have had evaluations of such products made by two major producers of cheese spreads. The several cheese spreads tested were made with 1, 2, 3 and 4% of our torula yeast autolysate and an intensified and stabilized cheese flavor was found in each case. No change in flavor as compared to prior cheese spreads made from the same cheese, was noted. From the viewpoint of the manufacturer or dealer, intensification and retention of flavor for longer times (greater shelf life) was found and is an important improvement. Intensification and retention of flavor in cheese products is important because such products are often used as components of other foods. The synergistic action demonstrated by the addition of our autolysate to cheese compositions makes it possible to obtain the same degree of flavor intensity with less material, thereby resulting in economies in manufacture. From the viewpoint of the user, the creamier and smoother texture of the cheese spreads is believed to be the most important improvement found. It has been noted that the emulsifying properties of the autolysate contribute greatly to the usually desired creamier, smoother product and make possible high grade products with less effort and expense on the part of the manufacturer.

It is to be noted that the autolysate itself has a shelf life of at least 6 months and does not require special handling or storage conditions during that time. The present autolysate is also especially useful as a carrier for flavorings and in the preparation of specialty meats including all kinds of sausages. In use of the autolysate, it is necessary only to take into account the sodium chloride content as the autolysate is otherwise compatible with any food products other than baked goods.

We claim:

1. The method of fixing and stabilizing the flavor of foods which includes preparing an autolysate of *Torulopsis utilis* with 16% sodium chloride solution in the ratio by weight of 1.0 part of yeast dried to no more than 5% moisture content to 2.3 parts of the solution, and mixing 1-5% by weight of the autolysate with the food until a homogeneous composition results.

2. The method of fixing and stabilizing the flavor of foods, which includes mixing 1.0 part by weight of *Torulopsis utilis* dried to no more than 5% moisture with 2.3 parts by weight of 16% sodium chloride solution, holding the mixture at no more than 40° C. with agitation until substantially complete autolysis without substantial degradation of the protein compounds thereof, and mixing 1-5% by weight of the autolysate with the food until a homogeneous mixture results.

3. The method of fixing and stabilizing the flavor of foods, which includes mixing 1.0 part by weight of *Torulopsis utilis* yeast dried to no more than 5% moisture with 2.3 parts by weight of 16% sodium chloride solution, holding the mixture at 37-40° C. for 24 hours with agitation until substantially complete autolysis without degradation of the protein combinations thereof, and mixing 1-5% by weight of the autolysate with the food until a homogeneous mixture results.

4. The method of fixing and stabilizing the flavor of foods, which includes mixing 1.0 part by weight of *Torulopsis utilis* yeast dried to no more than 5% moisture with 2.3 parts by weight of 16% sodium chloride solution, holding the mixture at no more than 40° C. and at pH 6.0-6.5 with agitation until substantially complete autolysis without degradation of the protein combinations thereof, and mixing 1-5% by weight of the autolysate with the food until a homogeneous mixture results.

5. The method of fixing and stabilizing the flavor of cheese food, which includes preparing an autolysate of *Torulopsis utilis* with 16% sodium chloride solution in the ratio by weight of 1.0 part of yeast dried to no more than 5% moisture content to 2.3 parts of the sodium chloride solution, melting the cheese to easy stirring viscosity, and mixing 1-5% by weight of the autolysate with the cheese until a homogeneous composition results.

6. The method of fixing and stabilizing the flavor of cheese food, which includes mixing 1.0 part by weight of *Torulopsis utilis* dried to no more than 5% moisture with 2.3 parts by weight of 16% aqueous sodium chloride solution, holding the mixture at no more than 40° C. with agitation until substantially complete autolysis without material degradation of the protein compounds thereof, melting the cheese to easy stirring viscosity, and mixing 1-5% by weight of the autolysate with the cheese until a homogeneous composition results.

7. A processed cheese spread made from oxidized cuttings of cheese and containing 1-5% of a sodium chloride autolysate of active *Torulopsis utilis* dried to not more than 5% water content, the autolysate having a protein to sodium chloride ratio of .9-1.2 to 1.0 and the proteins and carbohydrates of the yeast being in substantially their original form.

8. A processed cheese spread made from oxidized cuttings of cheese and containing 1-5% of a sodium chloride autolysate of *Torulopsis utilis* dried to not more than 5% water content, the autolysate being heated to no more than 40° C. whereby the proteins and carbohydrates of the yeast are retained in substantially their original form, the autolysate having a ratio of protein to sodium chloride of .9-1.2 to 1.0 and being a stable colloid of viscosity suitable for pumping.

References Cited in the file of this patent

UNITED STATES PATENTS

| | | |
|---|---|---|
| 1,611,531 | Kahn et al. | Dec. 21, 1926 |
| 1,702,303 | Kahn | Feb. 19, 1929 |
| 1,854,930 | Frey et al. | Apr. 19, 1932 |
| 2,764,487 | Wickerham et al. | Sept. 25, 1956 |